Patented Jan. 22, 1952

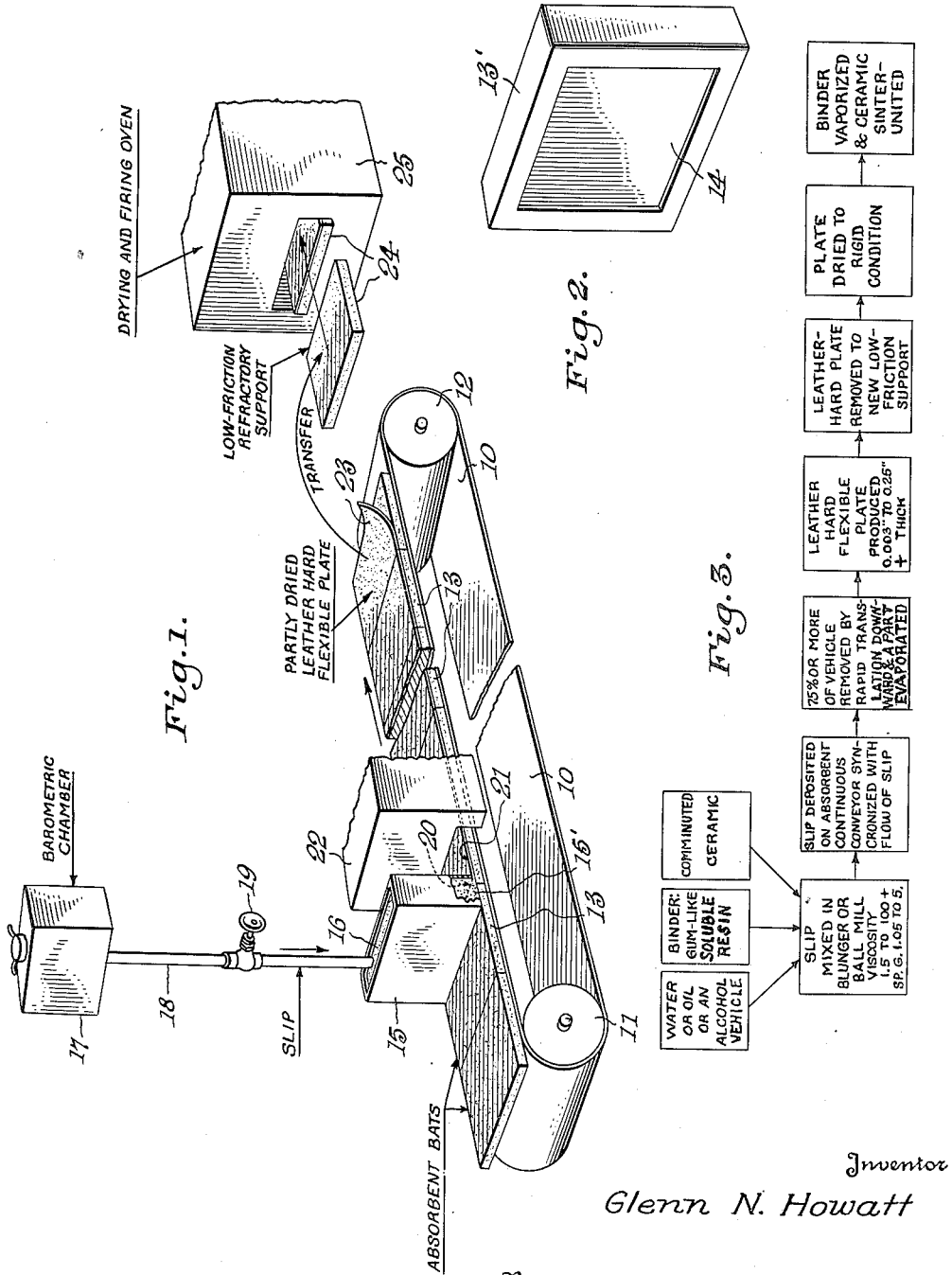

2,582,993

UNITED STATES PATENT OFFICE 2,582,993

METHOD OF PRODUCING HIGH DIELECTRIC HIGH INSULATION CERAMIC PLATES

Glenn N. Howatt, Metuchen, N. J.

Application October 29, 1948, Serial No. 57,285

11 Claims. (Cl. 25—156)

(Granted under the act of March 3, 1883, as amended April 30, 1928; 370 O. G. 757)

The invention described herein may be manufactured and used by or for the Government for governmental purposes, without the payment to me of any royalty thereon.

This application is a continuation-in-part of my copending application Serial No. 554,295, filed September 15, 1944, now abandoned.

The invention relates to methods for forming ceramic materials, and more particularly to methods for forming ceramic materials into flat plates of high and uniform density, substantially free of striations or stratifications, as well as substantially free of local strains and stresses affecting the structural strength or other physical values, particularly the dielectric strength and other electrical values of the product.

Heretofore flat ceramic plates such as porous diaphragms for use in the electro-chemical field, or flat ceramic plates for use on large size potentiometers or low loss radio panels were usually formed by either conventional casting, pressure moulding, or extrusion, and were seriously objectionable for many reasons consequent on such methods. The product of my invention is important in thin high dielectric plates for printed circuits, and other situations, and free of most, if not all, of the objections to the prior products indicated.

My invention takes the place of extrusion of ceramic articles and obviates many difficulties attending such manufacture. The extrusion of satisfactory thin plates is exceedingly difficult to accomplish due to the fact that the middle of the plate extrudes more rapidly than the lateral edge parts, and the inner parts more rapidly than surface portions. Strains thus occur in the body as it extrudes and striations are set up in the extruded piece due to these phenomena, resulting in stresses which cause cracks or distortions on drying and firing, as well as affecting the value of the product otherwise, especially for electrical uses. These difficulties are not encountered or are at least very substantially obviated in flat ceramic plates manufactured in accordance with my invention.

It is an object of my invention to provide a method for forming flat ceramic plates eliminating the necessity of casting, that is, conventional casting in molds by which the cast is confined on more than one side while setting.

It is still another object of my invention to provide a method for producing flat ceramic bodies without the necessity of either conventional casting, pressure molding, extrusion, or other flow-working of a plastic into a final shape.

Within recent years considerable improvement in ceramic dielectrics has been attained by discovery of new materials suitable for inclusion in the ceramic mix, but even with the best materials their highest capabilities are not realized if the shaping of the mixture into the desired forms involves disturbance of the distribution of materials in the shaped body, or if in the shaping of the body there are developed stresses, striations or stratifications. Perhaps the most serious defects which are often developed in such products, because they do not necessarily become apparent to superficial inspection, are development of strains in the partly perfected body, in the course of its shaping, as well as the setting up of internal stresses with or without strain, in such procedures. These defects are especially serious in extruded products where the mix is a plastic with a minimum of fluidity, and requires considerable pressure to extrude the mix through a die of the selected shape. Friction of the die pulls surface parts of the product backward and causes peculiar internal strains and stresses, striation, etc. The product often becomes deformed in baking or burning.

It is well recognized that internal stress in a dielectric will materially affect its dielectric qualities, as well as lowering its structural strength and changing its thermal response qualities. Extruded or compression-shaped bodies may pass through the complete manufacturing procedure to the finished article with an appearance of good quality, and yet have areas of low value, or lines along which break-down is a liability at too low a potential; or they may be otherwise defective for various electrical or structural requirements due to working of the mass by plastic flow during shaping. In such products there is a considerable loss involved by the fracturing of the product in course of baking and handling or by the accentuating during baking of internal stresses developed in the shaping stages, and which may result in breakage in handling or installation; or, if culled by conventional electrical tests, the high expense for such inspection and tests. And after all this, defects in the final product may still exist resembling the kinds mentioned which are not discovered even by extensive test.

These and other objects and advantages will become apparent in the following specification of embodiments of the invention, when read in connection with the drawings, in which:

Figure 1 is a schematic perspective view of apparatus to carry out my invention.

Figure 2 is a perspective view of a bat that may be utilized in the device illustrated in Figure 1.

Figure 3 is a flow diagram of the steps of procedure in the invention.

In carrying out my invention a slip is made containing the ceramic body, using a vehicle of either water, turpentine, pine oil, methanol, or other suitable liquid. The ceramic body used may include either steatite, porcelain, various refractory materials, titanate, alumina, etc., reduced to finely comminuted form. A binder may be added to give the ceramic product intermediate partly dry cohesion and initial dry strength, if necessary. Such a binder may be either dextrin, lignin, Catabond (a phenol formaldehyde water-soluble resin), waxes, various soluble resins, etc. It will appear hereinafter that the binder materials are of such nature and are used in such combination and proportions that a leathery, that is to say, a tough and flexible condition develops therein which is termed "leather hard" when the mix or slip is partially dried to a certain extent where a substantial part of the vehicle has been removed; and the product at this stage can be handled from point to point as a flexible sheet with small liability of permanent strain or breakage.

This leathery quality minimizes the liability of permanent strains being produced in the handling of the product in its intermediate stages, strains which might otherwise occur without superficial indication, but would seriously impair the dielectric and breakdown value of the resultant plate under high frequency high voltage electrical service.

The slip is thoroughly mixed in either a ball mill or a blunger to provide a blended mix or slip. The slip or mix is then placed in a constant level feed hopper the lower part of which forms a rectangular opening or nozzle to permit the slip or mix to freely flow therefrom. Below the feed hopper there is a continuously moving belt or endless conveyor upon which is placed a series of bats in contiguous relation. The bats may be formed of plaster of paris or other similarly porous highly absorbent material, and may be either flat or may have a mold-like depression. The bats are moved by the conveyor beneath the rectangular opening of the ceramic slip feed hopper so that the slip is fed directly onto each moving bat. The height of the feed hopper opening above the bats, the rate of feed of the conveyor and the viscosity of the slip determines the thickness of the ceramic plate to be formed. The slip is continuously spread on the bats by reason of the movement of the latter and the characteristic flow of a slip having the low viscosity indicated, the nozzle preferably substantially equaling the width of the bat, the trailing lower edge of the feed hopper (which acts as a doctor blade or valve, by restricting the rate of flow in the slip which is due to the hydraulic head of the slip) leaving a uniform thickness of material over the width of the plaster bats covered by the rectangular opening in the ceramic slip feed hopper.

The bats absorb the slip vehicle, and the absorption of the slip vehicle, aided by evaporation to an extent depending on whether a drier is used or not, changes the fluid slip into a material of leather-hardness condition, so that before or after complete drying, the ceramic plates may be handled. It is advantageous to transfer the leather-hard ceramic plates from the bats to refractory setters before drying is accomplished. To prevent cracking or local stressing of the ceramic plates during drying, it may be necessary in some instances to insert a piece of vellum paper between the refractory setter and the plate. After drying, the piece may be cut or the vellum may be removed and the piece fired to maturity. The refractory setter consists of a baked fire clay plate with a top surface finished to a very smooth condition, which may be attained by grinding after a final firing of the setter plate, if desired, especially for very thin products.

Referring to Figure 1, in which is illustrated a device arranged to carry out my invention, it is seen that the reference numeral 10 refers to an endless conveyor belt which passes around the rollers 11 and 12. Placed upon the endless conveyor belt 10 is a series of bats 13 which are in contiguous relationship with each other. As stated previously, the bats 13 are formed of plaster or some other hard porous highly-absorbent material. The bats 13 may be flat rectangular slabs or they may be of the type illustrated in Figure 2 of the drawings in which the bat is of rectangular configuration, having a rectangular shallow cavity 14 for the reception of the slip. The bats are highly absorbent and of a thickness many times greater than the deposits of slip to be carried thereby; and for thick deposits of slip are at least a multiple of the thickness of the slip, the aim being to enable the bat to quickly absorb 75% or more of the vehicle in the slip on the bat.

The slip or mix is fed by gravity from a container or hopper 15. The hopper 15 has an open bottom forming a rectangular opening or slot 15' serving as a nozzle for the feed of the slip or mix 16 by gravity. This discharge opening extends approximately the full width of the bats. The slip or mix 16 may be held at constant level in the container or feed hopper 15 by means of a barometric feed tank 17 and feed pipe 18. The pipe 18 may be fitted with a valve 19 to shut off the flow of slip from the tank 17 if desired. An agitator (not shown) may be added to the feed hopper 15 to keep the slip in a thoroughly mixed condition. The slip or mix is fed from the bottom opening or slot 15' of the hopper 15 onto the bat 13. The bottom edge of the forward hopper wall at the side of departure of the slip will act as a doctor blade 20, to smooth and level the slip. It should be understood, however, that with certain slips of the exceedingly low viscosity and high fluidity here described, the doctor blade has little effect on the depth of the slip or the nature of the surface of the material after the slip passes from the nozzle. The thickness of the slip deposited is actually determined by the viscosity of the slip, the speed of the conveyor, and the height of the hopper feed or nozzle opening above the bat 13. The impedance of flow downwardly through the nozzle by the close spacing of the nozzle and bat surface will oppose the hydraulic "head" of the slip proportionately, and with the speed of the conveyor properly adjusted, the deposited slip 21 is moved away as fast as it can flow downward to the bat. If the conveyor should move too slowly, material flows under the "doctor blade" edge 20 of the nozzle and forwardly in the direction of departure of the conveyor, exceeding the speed of the latter under the blade and raising the level of the departing slip above the bottom edge of the blade. This is contrary to the objects of the present invention, and would produce eddies in the slip, permanent traces and/or effects of which would remain in the product. Outward flow of slip tends to occur at all sides of the nozzle, but may be limited at three sides by having them lower and closer to the top of the conveyor bats. In this manner of control if the speed of the conveyor is excessive, the deposited slip 21 is carried away before it can build up to the level of the blade 20, and a proper thickness of deposit may not be derived. The slip is so fluid that it reaches a uniform thickness and level top surface by repose at a uniform depth determined by the quantity discharged and the effect of gravity. When a very thin body of slip is deposited on the moving flat bat, it is so shallow, and the hydraulic head in the pool so slight, that surface tension and the original viscosity of the slip as well as the rapid absorption of the vehicle into the bat (with its setting effect) together prevent any material escape of the slip from the bat. From close to the boundaries of the deposited slip the body produced has a uniform thickness throughout, and as the hardened article is to be trimmed to required sizes, no objectionable waste on account of thin edges occurs.

Where thick plates are to be produced, a more viscous slip may be employed. Plates of quarter inch thickness are practicable. It may be advantageous to use the recessed bats for very thick plates, and in that event the recess in the bat may be of a depth somewhat less than the thickness of slip deposited, the top surface of the deposited slip being then some distance above the rim of the bat and being retained by surface tension of the slip as in the case of deposits on flat bats. This facilitates the continuous deposit of slip notwithstanding the raised edges of the bats. With the recessed bat, plates exceeding quarter inch thickness are practicable, yet a comparatively high fluidity of slip may be employed.

The conveyor 10 and bats loaded with slip may be passed through a conventional drier tunnel 22, to aid removal of the vehicle by increased evaporation.

In the "leather-hard" state referred to above, the sheet product, resulting from the deposit of the slip and the absorption and/or evaporation of the vehicle, becomes a highly flexible gelatinous cohesive body 23 with sufficient tensile strength to permit the sheet deposited on one of the bats 13 to be lifted manually by two corners from the bat and laid on the setting refractory 24, by which it is carried through the baking or burning or drying and firing oven 25. It has a tensile strength approximating that of a medium quality wet bond paper. Fifty to ninety percent of the slip vehicle is removed when the deposited sheet attains this quality and reaches the point where it is removed from the bat to the refractory support. The rate of movement of the conveyor or the length thereof (and of the drier, if the latter is used) is proportioned to the time required for the material to reach the leather-hard condition, which varies according to the thickness of the deposit, humidity of drying air, temperature, binder formula, and vapor tension of vehicle. (Since the rate of the conveyor is also related to the viscosity and head of the slip, one or both the latter factors may require adjustment to the time element mentioned.) Thus the very thin deposits may require only two minutes or less, while a one-quarter-inch thick sheet may require twenty minutes or longer, with the same drier equipment.

Where the porous absorbent bats 13 are used, the fact that absorption of the vehicle by the bat occurs at a rate involving downward movement of the mix at a speed greater than that of the settling movement brings the aggregate to a fixed state in which the particles have the same distribution in area, and mutual relations proportionate to those existing in the initial suspension, considering the reduction in vertical dimensions. Consequently, no stratification develops. The deposit being made the full width of the bats, and the conveyor being moved at substantially— or, if possible, the same—speed as the rate of flow of the slip from the nozzle, no material flow of the slip relative to the bats occurs after it leaves the nozzle, so that striation from such cause does not tend to develop. Evaporation effected by heating the air about the loaded bats contributes further to the locking of the aggregate particles relatively before material settling.

It will thus be appreciated that, for obtaining the best results, there is an important relation between the rate of removal of the vehicle and the settling rate of the ceramic aggregate in the mix, largely determining as it does the degree to which avoidance of stratification is achieved. This has an important bearing on the structural strength of the product as well as on its good electrical qualities, as will be readily appreciated. These benefits have been achieved even where such high specific gravity material as barium titanate is used as the principal ceramic ingredient, under formulas developed in accordance with the present disclosure.

In addition to such as are generally mentioned above, specific examples of mixes which have been used are given below, and for materials appropriate to special electrical and structural requirements, extensive information is available in the published art, so that with the disclosure here made the various materials and mixtures heretofore known for special qualities can be readily adapted to my particular procedures and apparatus. The formulas given below reach the leather-hard condition in from 2 to 18 minutes in the method described.

*Examples of slip mixtures*

[Parts by weight]

|  |  | #1 | #2 | #3 | #4 |
|---|---|---|---|---|---|
| Staybelite (triethylene glycol dihydro-abietate) | A | 110 | 150 | 110 | 150 |
| Abalyn (methyl abietate resin) | A | 110 | 200 | 110 | 175 |
| Ethyl Cellulose | A | 30 | 30 | 30 | 30 |
| Toluol (vehicle) | A | 250 | 300 | 250 | 300 |
| Diethyl Oxalate | B | 25 | 30 | 25 | 25 |
| Soya lecithin | B | 10 | 10 | 10 | 10 |
| Toluol (vehicle) | B | 250 | 300 | 250 | 300 |
| TiO² |  | 2,790 |  |  |  |
| Putnam Clay |  | 30 |  |  |  |
| Zinc Titanate (ZnTiO₃) |  | 180 |  |  |  |
| BaTiO₃ |  |  | 1,969 | 3,215 |  |
| SrTiO₃ |  |  | 801 |  |  |
| MgZrO₃ |  |  | 80 |  |  |
| G. S. Zircon |  |  |  | 3,215 | 1,777.5 |
| Calcium Zirconium Silicate |  |  |  |  | 222.3 |
| Magnesium Zirconium Silicate |  |  |  |  | 222.3 |
| Barium Zirconium Silicate |  |  |  |  | 222.3 |
| Victoria Clay |  |  |  |  | 555.6 |

The binder elements in group marked "A" are preferably dissolved in the part of toluol named therein, and the elements in group "B" are similarly dissolved in the toluol remainder, after which A and B are mixed and the ceramic ingredients added, and intimately mixed, as, by ball milling.

The mixtures in the above formulas have each a specific gravity of about 2.3 and a viscosity approximately 2.3 times that of water at 25° C.

In the finished product the ceramic component represents practically the entire content.

As before stated, conditions may make it desirable to vary the viscosity, specially in case of thick plates, or heavy particulate, and viscosity may vary within a range extending from an extreme low between about 1.2 and about 2, up to about 100 times that of water, so that the slip may still function in the manner described. The specific gravity may vary from about 1.5 to about 5, more or less, according to the nature of the mix. In general, slips having a viscosity ranging from 2 to 3 times that of water at 25° C. and a specific gravity of about 2 to 3 are particularly preferred for the production of thin sheets or bodies.

There are several advantages in accomplishing the early removal of the deposited materials from the temporary supports or bats 13 to the refractory support upon which they are to be finally hardened and burned. One is the fact that if the slip partly solidified on the bat is retained thereon and both carried into the drying and burning ovens, greater expense is involved because of the large quantity of vehicle held by the bat which must be evaporated in addition to that lesser amount still retained in the deposited slip; and also, due to the quantity of vehicle held in the bat, markedly unequal drying rates would be manifest in the edge portions of the deposited slip and its central parts. The consequent early shrinkage in these outer parts would then be initially greater than at the center, with accompanying strains and stresses developed, possibly cracking the plates. Another important advantage of this transfer lies in the fact that it is made unnecessary to renew the bats as frequently. It is also possible to conserve heat further by using refractory supports successively without cooling after plates have been burned thereon, and heat is not wasted by cooling bats that have passed through the ovens. Perhaps the most important advantage is the fact that the removal of the product from the bat eliminates tendency of the product to adhere to the support in baking, and so to produce stress and strain or fracture from that cause, and makes it possible to obtain a maximum rate of absorption of the vehicle in the bat by the direct deposit of the slip upon the bat without the interposition of parting sheets. The latter, however, are readily used in the ovens, without sacrificing any advantages, but preserving the benefits which inhere in such practice. After removal of the leather-hard material from the initial support or bat, when it is then deposited on a second support for final drying and burning, with or without parting sheet, it is free to slip on the latter without adhesion or friction sufficient to develop stress or strain therein incident to shrinkage in final drying which will be more extensive thereafter than in the initial drying.

It will be appreciated that in a slip of such materials as stated, capable of flowing by gravity as described, the quantity of the vehicle is such that the ceramic body element is in a state of substantially complete suspension during its deposit on the travelling support, and that a uniform internal structure of the plate body will thereafter be produced by the intimate knitting together of the particles in a manner corresponding to sedimentation; but mere sedimentation (wherein certain parts might be deposited more rapidly than others, with liability of stratification) is avoided by reason of the relatively rapid downward extraction of the liquid vehicle by absorption in the highly absorbent bat support, which is shown to be of a volume much greater than that of the deposited slip. Consequently, up to this point, no or substantially no strains nor stresses can have developed in the body thus solidified; and there will be no or substantially no striation, with the accompanying inherent liability of development of stresses and distortions in baking, or affording inequalities of dielectric value.

The bonding components named are all of a kind which are vaporized in the final burning of the plates as described, and the mechanical strength and rigidity of the finished article is obtained by the sintering action on the ceramic content of the plates in the firing treatment.

For best results, it is important in the preparation of the mixes constituting the slip that their viscosity be made proportionate to the thickness of the plate to be produced and to the ingredients of the mix when using the steps of procedure above indicated. The specific gravity thus is a factor—that is to say, when a very heavy ceramic is used, the viscosity may be made greater, with advantage, than permissible where a lighter ceramic is incorporated as the principal dielectric component. In practice the viscosity has ranged from about 1.2 to 100 or more times that of water, so that it will be seen that under all conditions a very low viscosity and exceptionally high fluidity is manifest in the slip, as compared to slips known and used heretofore in manufacture of ceramics and clay products. The lower viscosity has been used in producing sheets of three one-thousandths inch (.003") thickness, and the higher viscosity named has been used in producing a sheet or plate one eighth inch (⅛") thick.

A function of the hopper tank 15 is to maintain a uniform hydraulic "head" on the slip as it is discharged through the nozzle or port 15', and for this purpose it may be understood that the pipe 18 must be capable of supplying the slip from reservoir 17 faster than it is discharged from the hopper. The reservoir 17 being a barometric chamber, slip cannot flow therefrom as long as the lower end of pipe 18 is closed at liquid level in the hopper, but as soon as discharge to the conveyor lowers this level, air enters the pipe and bubbles upward into the reservoir permitting flow of slip therefrom. The bubbling of the air through the pipe and slip in the reservoir serves to agitate and stir the content of the reservoir so as to prevent settling or classifying action of gravity on the aggregate in the mix. The capacity of the hopper may be small so that its content is renewed frequently and settling minimized, but its height is made commensurate with a maximum hydraulic head to be maintained.

If desirable, the pipe 18 may be made extensible so as to regulate the top level of slip in the hopper appropriately for the viscosity of the slip, thickness of the deposit on the conveyor, and rate of movement of the conveyor. In such case, the level might be low in the hopper for low viscosity slip and thin deposits or slow conveyor speed, and high for more viscous or thicker deposits and/or rapid conveyor movement.

The principal regulatory function of the valve 19 is as a cutoff when the machinery is stopped, and when the system is in operation the valve may be kept full open, as the barometric function of the device is self-regulatory. Trapping of air or delaying of displacement of slip in the reservoir are also avoided thereby.

Should deairing become a problem, conventional deairing methods may be employed.

The ceramic material used in the slip is comminuted to sizes preferably below 15 microns. Gentle agitation keeps the ceramic suspended with no settling, and the ingress and ebullition of air through the pipe 18 is ordinarily sufficient to effect sufficient agitation automatically. The slip composed as described in its most fluid form may stand an hour or more without objectionable sedimentation.

The conveyor is operated at a speed which is sufficient to require a rapid flow of slip from the hopper in relation to the rate of settling, so that no consideration need be given to any effect of settling during the time the slip is in the hopper.

In the operation of the conveyor and the hopper the slip is deposited as a pool which, due to the maintenance of the conveyor and bats in a level position does not escape materially—if at all— from the sides of the flat bats, but by its fluidity and surface tension reaches a stable top and side surface condition with slight diminution in thickness at the edges of the conveyor or bats. In the thicker deposits of slip there occurs some irregularity of thickness in the extreme boundary portions of the slip pool, usually not extending further than half an inch from the border. For accurately shaped plates these edges may be trimmed from the sheet stock after attaining the leather-hard state, or after burning.

In reference to certain materials referred to as suitable for use in the mixtures forming the slip, the following are defined:

Alumina may include many forms known to have qualities desirable in ceramic bodies but it is preferable to use a ground fused material rather than precipitated ones such as hydrated alumina or alumina gel. Either purified or commercial soya lecithin may be used. Lignin may be used in the form of sulphonated lignin, for instance.

Refractory materials other than those specifically named above may be selected for their desired qualities and acceptability as to dielectric values, mechanical strength, thermal stability, shock resistance, surface condition, thermal conductivity, power factor, dielectric constant, breakdown voltage index, etc.

It will be appreciated from the foregoing disclosure that upon drying, the binder becomes a rigid matrix of material volatilizable at the usual firing temperatures used in baking ceramics, that is, the temperatures to which the ceramic body is itself heated, and that as a result the final product is practically a pure ceramic composed almost, if not entirely, of the ceramic component or components which have been selected for their electrical and/or structural qualities appriate to specified uses, and that the particles carried by the matrix are directly united by the sintering usually accompanying the proper firing of such materials.

An outstanding quality and characteristic in the finished product is its substantially complete freedom from peculiar local variations in the distribution of the particulate in area, or material change in relative position thereof vertically in the plate as compared to the suspension initially in the vehicle, as well as freedom from irregularity in density, or stress, and from local stresses in limited areas of the body. This is true whether they be such as might be due to difference in or disturbance of the homogeneity or intermixture of the ceramic content particles or due to flow movements of the material in the body after deposit and in course of formation from the highly liquid and thoroughly agitated mix or slip into the leather-hard form where the particulate becomes locked in its distribution throughout the plate body. It is also free of such defects caused by handling in transfer from the initial conveyor device to the support by which it is carried through the drying and firing treatment. Defects in the respects named and like or other objections of which my product is free are commonly found in ceramic products heretofore produced by known processes.

It should be appreciated that in the leather-hard condition of the product complete drying has not been effected, and the natures of the materials of the slip are such that on complete drying and before the volatilization of the binder, the plate becomes a rigid, although still not finished, article. In the leather-hard condition, however, a sheet 0.10 inch thick may be bent around a cylindrical shape of 1½ inch radius without detriment.

No material shrinkage occurs in the product in directions parallel to the bat up to the formation of the leather-hard plate and its removal from the bat in the second support or refractory: the major shrinkage of the article occurs in the course of drying from the leather-hard condition to a rigid state. If it were dried while retained on the absorbent bat, it would tend to adhere sufficiently to the bat to develop stresses by contraction of the plate material, as well as irregularities of internal stresses due to the vehicle in the bat causing slower drying of the slip and plate at the middle than at the sides of the product. Transfer to the refractory support involves elimination of adhesion and the reduction of friction, so that this second support to which the plate is transferred for drying and firing may be termed a low-friction support, with or without an interposed separator surface. It may be appreciated, therefore, that the shrinkage is by the method described limited to that part of the process in which the plate is relieved of both external and internal forces opposing shrinkage, so that the shrinkage is effected uniformly without disturbance of the internal homogeneous condition of the body of the plate, both as to distribution of the particulate, and as to the stress or absence of stress throughout the body.

The product derived by my method, as disclosed, overcomes the objections found in prior products as stated hereinbefore. It shows a uniform homogeneous distribution of particulate in all sections, the plates are free of distortions after final burning, the thermal coefficient is good and the dielectric qualities are stable and uniform throughout the body both at atmospheric and higher or lower temperatures. The plate produced has a uniform high dielectric strength, low power factor, and high volume resistivity throughout its dimensions, and has high structural strength in all respects essential in installations, and especially under exceptional temperature variations including high temperatures up to melting points of conductor materials ordinarily employed.

By reason of the method disclosed the electrical values of my product are superior to those of products produced by prior methods with similar ceramic base materials. The structural values are at least equal in respect to tensile, bending and crushing strengths; and surface qualities, porosity, etc., may be developed to meet various specific requirements.

I claim:

1. In a method of forming high dielectric flat ceramic bodies of uniform electrical qualities throughout, the steps of forming a highly fluid slip by combining a ceramic frit material and a solute binder with a liquid vehicle which includes a solvent of the binder capable of forming therewith and with the ceramic when partly dried a leather-hard body sheet capable of flexure and suspension by one edge without permanent strain, establishing upon a flat horizontal vehicle-absorbent support a highly liquid pool of said slip otherwise unconfined whereby said slip distributes itself by action of gravity to a uniform depth and is retained within the boundaries predetermined for said sheet by surface tension of the liquid, removing a sufficient quantity of said liquid vehicle from said slip principally by rapid absorption downwardly in said vehicle-absorbent support at a rate of translation of the vehicle downwardly into the vehicle-absorbent support greatly exceeding the settling rate of the suspension so that the material forming said pool becomes leather-hard, separating said leather-hard material from said vehicle-absorbent support, drying said leather-hard material, firing the dried material to remove the binder, and sinter-uniting the ceramic particulate.

2. In a method of forming high dielectric flat ceramic bodies of uniform electrical qualities throughout, the steps comprising establishing a pool of ceramic slip of viscosity between 1.2 and 100 as compared to that of water having a volatile solvent liquid vehicle and a binder solute capable of forming with the remainder a leather-hard sheet capable of flexure and suspension by one edge after reduction of the vehicle to a predetermined content, depositing the slip upon a horizontal solid suport of vehicle-absorbent material of planiform shape, retaining the remaining sides of said pool by surface tension of the liquid and exposed to the atmosphere, maintaining the deposited slip in an internally and externally stable condition static in relation to the support throughout immediately upon deposit, permitting gravity to establish a top planiform surface thereon, and removing some of the liquid vehicle from said slip by simultaneous evaporation at atmospheric pressure at the unconfined portions of the pool of slip and by absorption of a principal part in said solid support at a rate exceeding the settling rate of the ceramic content in said slip whereby said ceramic material becomes a leather-hard, intermediate product substantially without flow movement traces therein, free of change of distribution of frit or stratification by settling and capable of being handled, and adapted to conventional finishing treatments to produce a rigid ceramic plate.

3. A method for continuous production of thin flat ceramic plates of high dielectric strength, substantially free of stains, internal stresses and striations, comprising forming a slip having viscosity of between 1.2 and 100 as compared to that of water consisting of a ceramic particulate body content, soluble binder dispersible by ceramic firing heat, and a solvent liquid vehicle in quantity sufficient to produce a ceramic suspension capable of flowing by gravity to a level and uniform depth on a horizontal surface said binder being of a kind such that with a certain lower content of vehicle in the slip, the slip will be a leather-hard flexible body capable of suspension by one edge in sheet form; moving a substantially flat support horizontally in close slip-receiving relation below a place of slip deposit and at a speed proportionate to the rate of hydrodynamic flow horizontally by gravity characteristic of such named slip when discharged under a given hydraulic head, and flowing the slip with said head horizontally in the direction of movement of said support in alignment with the top of the support and said path in a stream with a depth equal to the depth of deposit desired, and a width equal to that of the desired deposit, so that movement of the stream and support are synchronized and the slip hydrodynamically maintained in a condition of repose internally and externally and static relative to the support as the support passes said place of slip deposit, rapidly removing a large part of the vehicle content of the slip in a downward direction with a rate of downward translation greater than the settling movement of the said particulate, until the vehicle content is lowered to form of the remainder of the slip said leather-hard body, removing the body from said support, drying the body, burning the body to remove the binder, and sinter-uniting the ceramic particulate to form a ceramic plate.

4. The method of claim 3 including the step of removing the said large part of said vehicle content principally by rapid translation downwardly throughout the area of the slip independently of gravity.

5. The method of claim 3 wherein said slip is introduced upon said support through an elongated nozzle of rectilinear shape arranged transversely of the path of the support, extending approximately the full width of the latter, and adjusting the mouth of the nozzle from the support a distance such as to limit the speed of flow of slip to approximate the speed of said support.

6. In the production of high dielectric ceramic plates from slip deposited on a flat horizontally moving support, the steps comprising forming the slip with a viscosity of not more than approximately 100 times that of water, and of a composition having the property of setting to a leather-like quality when its vehicle is reduced beyond a critical content, flowing the slip continuously in a horizontal direction hydrodynamically and initially with the depth desired in the deposit and moving the support synchronously with the flow of slip so as to establish substantially immediate static condition of the slip on the support under action of gravity and surface tension of the liquid slip and removing the vehicle to said critical content during conveyance of the slip by said support and within a time less than that required for ceramic particulate in suspension to vary its initial relative vertical distribution in the slip appreciably.

7. In the production of ceramic plates of high dielectric constant and uniform high breakdown strength throuhgout, steps comprising forming a slip of low viscosity with the ceramic as a frit particulate suspension in a solvent vehicle volatile at low temperatures and a soluble binder evaporable at high temperatures, feeding the slip in a hydraulic stream to a place of discharge, causing the slip to move by its characteristic hydrodynamic flow solely in one horizontal direction laterally from said line throughout the length of the latter, moving a support across said line in said direction in supporting relation to the under side of the horizontally departing stream, establishing flow of the slip at said line at a speed synchronized with speed of movement of the support and with a viscosity of the slip such that a predetermined depth of slip will be immediately established at said line and on the departing portion of the support as a self-levelled gravity-stabilized pool, drying the slip to evaporate the vehicle, burning the residue to evaporate the binder and sinter-uniting the ceramic frit.

8. The method of producing thin ceramic plates of high dielectric and high uniform breakdown values comprising forming a highly liquid slip of a solvent vehicle volatile at low temperatures, a solute binder volatile at high temperatures and a ceramic particulate in suspension therein, continuously moving horizontally a substantially flat horizontal initial support, continuously flowing the slip horizontally in the direction of movement of the said support by gravity onto the support simultaneously throughout the width of the support with a hydrodynamic flow rate the same as to the rate of movement of the support and having an initial depth on the support the same as the desired thickness of the deposit, so as to form a pool of slip on the support and unconfined at its sides and top stabilized as to thickness and surface by repose under action of gravity, removing the vehicle progressively thereafter maintaining the horizontal distribution of particulate constant, moving the particulate progressively by translation of all particulate downward in the upper part of the slip to a limited intermediate denser distribution in the pool so as to constitute a homogeneous suspension of the whole of the particulate in a lesser volume of the vehicle, removing that part of the vehicle which is in excess of said lesser volume until the residue constitutes a flexible coherent leather-hard plate on said support capable of removal from the support and suspension by one edge, removing the leather-hard plate from the initial support to a second support, drying the plate to a rigid body thereon, and firing the plate to evaporate the binder and sinter the particulate.

9. In a continuous process for producing from ceramic slip high dielectric, high insulation breakdown plates substantially free of striations and stratification, and substantially free of unequal internal stresses, the steps of preparing a slip of viscosity below 100 as compared to that of water, moving in a horizontal path a horizontal planiform absorbent support at a speed not exceeding the characteristic rate of flow of said slip hydrodynamically when free upon a horizontal surface with the same depth as the slip pool to be formed on said support, flowing the slip horizontally and hydrodynamically at the same speed as the support and in the same direction in a path parallel to and aligned with that of the support and upon the support from a line across said path and in a stream substantially equal to the width of the pool to be formed on the support, and removing the vehicle of the slip principally downwardly through said support and within a time less than required for a ceramic particulate in suspension in the slip to appreciably alter its vertical distribution other than proportionately to reduction of thickness of the deposited material on the support until the particulate is fixed in the body remaining by partial solidification of the latter.

10. In a continuous system method for producing from a ceramic slip high dielectric high insulation plates substantially free of striations, stratification, and unequal internal stresses, the steps of preparing a slip of low viscosity capable of flowing hydrodynamically rapidly to a condition of repose on a horizontal surface and with a ceramic particulate therein with a predetermined maximum rate of settling of the particulate therein, moving continuously along a horizontal path an absorbent support having a horizontal upper surface, and flowing said slip horizontally and hydrodynamically by its characteristic rate of gravitational motion at the top level of the support and in contact with said upper surface in the same direction with movement of and at the same speed as the support with a depth such that the slip may form a pool of a lateral dimension limited by the surface tension of the liquid of the slip substantially to the width of the flow at a line of beginning across the said path with the flowing slip substantially in repose and in static relation to the moving support immediately at said line of beginning in all directions, said rate of settling being materially less than the rate of downward movement of the vehicle due to absorption of the vehicle in said support, said support having an absorptive capacity equal to a major part of the vehicle.

11. In the production of thin flate high dielectric ceramic plates from a liquid slip which is to be dried and the residue burned ceramically, the method comprising the steps of forming a highly liquid slip having a solvent vehicle, dissolved binder and a ceramic in suspension therein, said slip having a specific viscosity of between 1.5 and approximately 100 compared to the viscosity of water, horizontally moving a flat horizontal support penetrable by said vehicle, flowing onto said support in the direction of the motion of the latter a stream of said slip having a width equal to that of the product transverse to the said movement, flowing the slip horizontally and hydrodynamically in the same direction as the movement of the support and in quantity proportionate to the speed of movement of the support and to the thickness of deposit desired, so as to form a shallow pool of slip approximately static on and relative to the support both horizontally and vertically and otherwise unconfined, extracting a major part of the vehicle by translation downwardly into the said support and a part by evaporation from the exposed surfaces of the deposited slip, to partly dry the deposit, removing the partly dried deposited material from the said support to another support, drying the said material, evaporating the binder and sintering the said ceramic while preserving the form of the dried material.

GLENN N. HOWATT.

REFERENCES CITED

The following references are of record in the file of this patent:

UNITED STATES PATENTS

| Number | Name | Date |
|---|---|---|
| 47,427 | Kelly | Apr. 25, 1865 |
| 573,928 | Stevens et al. | Dec. 29, 1896 |
| 752,573 | Morse | Feb. 16, 1904 |
| 1,467,902 | Mauch | Sept. 11, 1923 |
| 1,600,286 | Lea | Sept. 21, 1926 |
| 1,690,208 | Ross et al. | Nov. 6, 1928 |
| 1,692,887 | Casselman | Nov. 27, 1928 |
| 1,845,695 | Young | Feb. 16, 1932 |
| 1,869,090 | Borchert | July 26, 1932 |
| 2,161,308 | Murphy et al. | June 6, 1939 |
| 2,181,452 | Ford | Nov. 28, 1939 |
| 2,266,636 | Hauser | Dec. 16, 1941 |
| 2,266,637 | Hauser | Dec. 16, 1941 |
| 2,273,016 | Bower | Feb. 17, 1942 |
| 2,341,732 | Marvin | Feb. 15, 1944 |
| 2,361,311 | Miller | Oct. 24, 1944 |
| 2,371,353 | Parsons | Mar. 13, 1945 |
| 2,446,782 | Otis et al. | Aug. 10, 1948 |
| 2,482,094 | Chavannes et al. | Sept. 20, 1949 |
| 2,486,410 | Howatt | Nov. 1, 1949 |